United States Patent
Charra et al.

(10) Patent No.: US 7,917,701 B2
(45) Date of Patent: Mar. 29, 2011

(54) CACHE CIRCUITRY, DATA PROCESSING APPARATUS AND METHOD FOR PREFETCHING DATA BY SELECTING ONE OF A FIRST PREFETCH LINEFILL OPERATION AND A SECOND PREFETCH LINEFILL OPERATION

(75) Inventors: Elodie Charra, Antibes (FR); Philippe Jean-Pierre Raphalen, Valbonne (FR); Frederic Claude Marie Piry, Cagnes-sur-Mer (FR); Philippe Luc, Nice (FR); Gilles Eric Grandou, Plascassier (FR)

(73) Assignee: ARM Limited, Cambridge (GB)

( * ) Notice: Subject to any disclaimer, the term of this patent is extended or adjusted under 35 U.S.C. 154(b) by 715 days.

(21) Appl. No.: 11/716,675

(22) Filed: Mar. 12, 2007

(65) Prior Publication Data
US 2008/0229070 A1    Sep. 18, 2008

(51) Int. Cl.
*G06F 12/02* (2006.01)
(52) U.S. Cl. .. 711/137; 711/122; 711/133; 711/E12.057
(58) Field of Classification Search ........... 711/122, 711/133, 134, 137, E12.021
See application file for complete search history.

(56) References Cited

U.S. PATENT DOCUMENTS

| | | | | |
|---|---|---|---|---|
| 5,664,147 A * | 9/1997 | Mayfield | | 711/137 |
| 5,680,564 A * | 10/1997 | Divivier et al. | | 712/205 |
| 5,758,119 A * | 5/1998 | Mayfield et al. | | 711/122 |
| 6,085,291 A * | 7/2000 | Hicks et al. | | 711/137 |
| 6,314,494 B1 * | 11/2001 | Keltcher et al. | | 711/137 |
| 6,535,962 B1 * | 3/2003 | Mayfield et al. | | 711/137 |
| 6,574,712 B1 * | 6/2003 | Kahle et al. | | 711/137 |
| 2002/0083273 A1 * | 6/2002 | Matsubara et al. | | 711/137 |
| 2003/0105926 A1 * | 6/2003 | Rodriguez | | 711/129 |
| 2003/0236949 A1 * | 12/2003 | Henry et al. | | 711/137 |
| 2007/0101066 A1 * | 5/2007 | Al Sukhni et al. | | 711/137 |

OTHER PUBLICATIONS

Hennessy, John L. and David A. Patterson. Computer Architecture: A Quantitative Approach. 2003. Morgan Kaufmann Publishers. 3rd ed. pp. 439-442.*
Myoung Kwon Tcheun, Hyunsoo Yoon, and Seung Ryoul Maeng. "An Adaptive Sequential Prefetching Scheme in Shared-Memory Multiprocessors." 1997. IEEE. ICPP'97.*
James L. Hein. Discrete Mathematics. 1996. Jones and Bartlett Publishers, Inc. pp. 31-32.*
Intel. Intel Architecture Optimization: Reference Manual. 1999. Intel Corporation. Order No. 245127-001. Ch. 6.*
Johnson Kin, Munish Gupta, and William H. Mangione-Smith. "The Filter Cache: An Energy Efficient Memory Structure." 1997. IEEE. MICRO '97.*

* cited by examiner

*Primary Examiner* — Reginald G Bragdon
*Assistant Examiner* — Nathan Sadler
(74) *Attorney, Agent, or Firm* — Nixon & Vanderhye P.C.

(57) ABSTRACT

Prefetch circuitry is provided which is responsive to a determination that the memory address of a data value specified by a current access request is the same as a predicted memory address, to perform either a first prefetch linefill operation or a second prefetch linefill operation to retrieve from memory at least one further data value in anticipation of that data value being the subject of a subsequent access request. The selection of either the first prefetch linefill operation or the second prefetch linefill operation is performed in dependence on an attribute of the current access request.

14 Claims, 5 Drawing Sheets

CACHE CIRCUITRY, DATA PROCESSING APPARATUS AND METHOD FOR PREFETCHING DATA BY SELECTING ONE OF A FIRST PREFETCH LINEFILL OPERATION AND A SECOND PREFETCH LINEFILL OPERATION

BACKGROUND OF THE INVENTION

1. Field of the Invention

The present invention relates to cache circuitry for a data processing apparatus, a data processing apparatus including such cache circuitry, and a method for prefetching data for storing in the cache circuitry.

2. Description of the Prior Art

A data processing apparatus will typically include one or more data processing units which are operable to perform data processing operations on data values stored in memory. Since accesses to memory are relatively slow, and hence are likely to adversely impact the performance of the processing unit, it is known to provide one or more caches within the data processing apparatus for storing a subset of the data values so that they can be made available to the processing unit more quickly than if instead they had to be accessed directly from memory.

When a processing unit wishes to access a data value, it will typically issue an access request specifying an address in memory of the data value required to be accessed. A cache receiving that access request will typically be arranged to determine from the specified address, or at least from a portion thereof, whether the data value the subject of the access request is stored within one of the cache lines of the cache (this being referred to as a hit condition), and if so to allow the data value to be accessed in the cache. For a write access, this will involve updating the relevant data value within the identified cache line, whereas for a read access this will involve returning to the processing unit the data value as read from the identified cache line.

If on receipt of an access request, the cache determines that the data value the subject of the access request is not present in the cache (referred to as a miss condition), then the cache may be arranged to perform a linefill operation in order to retrieve into the cache a cache line's worth of data from memory, including the data value the subject of the access request, so that the data value can then be accessed directly from the cache. As part of such a linefill procedure, it will be necessary to select a cache line in which this new content is to be stored. If that selected cache line is currently storing data relating to a write through region of memory, any updates to that cache line's data will also have been made to memory, and accordingly there is no need to output the current contents of that cache line to memory before overwriting it with the new content retrieved as part of the linefill procedure. However, if the current contents of that cache line relate to a write back region of memory, it will additionally be necessary as part of the linefill procedure to evict the current cache line's contents to memory to ensure that memory is updated to reflect any changes that have been made to the current content of the cache line.

It is known within data caches to provide mechanisms that seek to detect patterns of accesses, and upon such detection to seek to prefetch data into the cache in the expectation that that data will subsequently be requested by the processing unit. Such mechanisms can be employed irrespective of whether the cache is arranged as a write through cache or a write back cache, or indeed as a combination of both.

Typically, such prefetch mechanisms perform linefill operations to prefetch from memory data at addresses determined by extrapolating from the addresses specified by access requests in which the pattern has been detected. For example, if a sequence of access requests are observed where the first access is to address X, the next access is to address X+2, and the following access is to address X+4, a stride of two may be detected, and cause the prefetch circuitry to be activated to start prefetching data from addresses X+6, X+8, etc.

In large caches, such as those used to form level two caches within a data processing apparatus, it is known for the prefetch circuitry to issue a sequence of addresses, with the data values returned being allocated into corresponding cache lines. If the predicted accesses then take place with respect to that cache, the data values will already be stored in the cache, and a cache hit will immediately be detected on performing a cache lookup. This optimises the speed for handling such access requests. However, since the accesses corresponding to the prefetched data are only predicted, they may in fact not occur, and in that event the cache will have been polluted with data that is not actually needed, thereby reducing the efficiency of the cache. For relatively large caches, such pollution has not been considered to be a significant problem.

However, for smaller caches, pollution is a much more significant problem, and can have a much greater adverse effect on performance of the cache. Accordingly, in smaller caches, such as for example those used to implement level one caches, prefetch circuitry once activated will typically perform one linefill request at a time, with the data obtained as a result of that linefill request being stored in a linefill buffer, but not at that time being allocated to the cache. Instead, the data is only allocated from the linefill buffer into the cache if the processing unit does in fact issue an access request seeking to access that prefetched data. Thereafter, the prefetch circuitry may optionally issue another linefill request to prefetch another cache line's worth of data for storing in the linefill buffer. Whilst such an approach has some impact on the speed of handling the access request, since the data is not already in the cache array at the time the access request is received in the cache, and instead has to either be read from the linefill buffer or read after the data has been allocated into the cache array, it does avoid the earlier-mentioned pollution problem.

SUMMARY OF THE INVENTION

Viewed from a first aspect, the present invention provides cache circuitry for use in a data processing apparatus, the cache circuitry comprising: a cache storage comprising a plurality of cache lines for storing data values; control circuitry, responsive to an access request issued by a device of the data processing apparatus identifying a memory address of a data value to be accessed, to cause a lookup operation to be performed to determine whether the data value for that memory address is stored within the cache storage, and if not to initiate a linefill operation to retrieve the data value from memory; and prefetch circuitry, responsive to a determination that the memory address specified by a current access request is the same as a predicted memory address, to perform either a first prefetch linefill operation or a second prefetch linefill operation to retrieve from said memory at least one further data value in anticipation of that at least one further data value being the subject of a subsequent access request; the first prefetch linefill operation comprising issuing a sequence of selected memory addresses to said memory, and allocating into a corresponding sequence of cache lines of the cache storage the further data values returned from said memory in response to the sequence of selected memory addresses; the second prefetch linefill operation comprising issuing a selected memory address to said memory, and storing in a linefill buffer the at least one further data value returned from said memory in response to that selected memory address, the at least one further data value only being allocated into a cache line of the cache storage when the subsequent access request specifies said selected memory address; and the prefetch circuitry being responsive to an attribute of said current access request to select either said first prefetch linefill operation or said second prefetch linefill operation.

In accordance with the present invention, the type of prefetch linefill operation performed by prefetch circuitry is selected based on an attribute of a current access request. In particular, the prefetch circuitry is arranged so that it can perform either a first prefetch linefill operation or a second prefetch linefill operation. If the first prefetch linefill operation is selected, a sequence of memory addresses are issued to the memory, and the data returned from the memory is allocated into the cache storage once it is returned from the memory, and without awaiting receipt of any further access request from the device. In contrast, if the second prefetch linefill operation is selected, a selected memory address is issued to the memory, and the data values returned from the memory in response to that issued address are stored in a linefill buffer. Only when a subsequent access request from the device specifies that selected memory address will the data values be allocated into the cache storage.

By enabling the prefetch circuitry to employ either the first prefetch linefill operation or the second prefetch linefill operation, and to select between those linefill operations dependent on an attribute of a current access request, this enables the prefetch mechanism to be altered dependent on such an attribute. The first prefetch linefill operation will tend to improve performance, but will contribute to polluting the cache storage content if the data prefetched is in fact not required by subsequent access requests. In contrast, the second prefetch linefill operation will avoid pollution of the cache contents, but gives a slightly reduced performance when compared with the first prefetch linefill operation in situations where the prefetched data is in fact required by subsequent access requests. By using the attribute of a current access request to choose between the two prefetch linefill operations, the operation of the prefetch circuitry can be altered to seek to provide the most efficient mechanism having regards to certain types of access request.

The attribute of the current access request used to select between the two prefetch linefill operations can take a variety of forms. However, in one embodiment, the attribute of said current access request comprises an indication as to whether that current access request is being issued by said device to perform a preload operation, if the current access request is being issued to perform said preload operation the prefetch circuitry performing said first prefetch linefill operation, whereas otherwise the prefetch circuitry performing said second prefetch linefill operation. A preload operation is performed by a device to cause data to be loaded into the cache before a subsequent load operation then causes that data to be read from the cache into working registers of the device. This improves the predictability of timing of the subsequent load operation, since at that time the data may be in the cache (the probability of a cache hit is increased). If the device is performing a preload operation, it is likely that the data being preloaded will subsequently be used by the device. It is also typically the case that the preload operation is repeated multiple times for a sequence of addresses separated by a common stride, and accordingly once the stride has been detected, it is likely that subsequent preload operations will in fact occur with respect to addresses that can readily be predicted using the stride information. As a result, when prefetching in respect of such preload operations, it is beneficial to use the first prefetch linefill operation, since the improved performance will be beneficial, and there is a significant chance of the prefetched data actually being the subject of subsequent preload operations.

In contrast, for operations other than preload operations, there may statistically be less chance that the prefetched data will in fact be used, and accordingly it may be more appropriate to employ the second prefetch linefill operation so as to avoid any unnecessary cache pollution.

In one particular embodiment, the prefetch operation is performed by the device in response to execution of a preload instruction. A preload instruction can be inserted into a sequence of instructions forming a software program in order to cause data to be loaded into the cache ahead of the time it is required by subsequent data processing operations within the program. Often, such preload instructions are provided within a loop of program instructions that are repeatedly executed by the device. In such instances, the overhead of including a preload instruction in the sequence is mitigated by the fact that the preload instruction is executed multiple times.

In one embodiment, the number of memory addresses within the sequence issued when employing the first prefetch linefill operation is predetermined. However, in an alternative embodiment, the prefetch circuitry is responsive to an indication as to whether the lookup operation performed by the control circuitry detects a hit in the cache storage to determine a number of selected memory addresses to form said sequence issued when performing said first prefetch linefill operation. It is initially expected that when the prefetch operation starts subsequent access requests issued by the device will not initially hit within the cache storage. For each access request of a type associated with the first prefetch linefill operation, the indication as to whether the lookup performed by the control logic in respect of the access request has hit in the cache or not can be used to determine the number of selected memory addresses to form the next sequence issued when the first prefetch linefill operation is next performed. Hence, that number can be dynamically altered on subsequent iterations with the aim of increasing the likelihood that a subsequent access request issued by the device will result in a hit in the cache.

In one particular embodiment, a current value of said number is incremented by a predetermined value if said indication indicates that the lookup operation has not detected a hit in the cache storage. For example, if on a first iteration of the first prefetch linefill operation, two prefetch linefill requests were issued specifying two memory addresses, and the next access request received by the control logic still resulted in a cache miss, then on the next iteration of the first prefetch linefill operation, the number of prefetch linefill requests issued can be increased so as to specify a larger number of addresses, and accordingly cause a larger number of cache lines to be retrieved and allocated into the cache. By such an approach, assuming the access requests continue to follow the expected pattern, it is likely that there will become a point where an access request received by the control logic will result in a hit in the cache storage.

In one embodiment, the current value of said member is not altered if said indication indicates that the lookup operation has detected a hit in the cache storage. Accordingly, in which embodiments, on each iteration of the first prefetched linefill operation, the number of memory addresses issued is increased until a point is reached where an access request from the device produces a hit in the cache, at which point that number is fixed, and each subsequent iteration of the first prefetch linefill operation then issues the same number of selected memory addresses.

If at some subsequent point, access requests conforming to the expected pattern start to miss again in the cache, the above described mechanism can be reinvoked to begin to increase on each iteration the number of addresses issued when performing the first prefetch linefill operation.

In one embodiment, the operation of said prefetch circuitry is repeated each time a determination is made that the memory address specified by a subsequent current access request is the same as a subsequent predicted memory address. Hence, in such embodiments, the prefetch process continues to be used whilst the access requests received by the control logic continue to follow a predicted pattern.

In one embodiment, the operation of said prefetch circuitry is terminated upon determination that the memory address specified by said subsequent current access request is different to a subsequent predicted memory address. Hence, in such an embodiment, as soon as an access request is received which does not conform to the expected pattern, the prefetching process is stopped. In an alternative embodiment, rather than terminating the prefetch process as soon as an access request is received that does not conform to the expected pattern, the prefetch circuitry can be arranged to continue prefetching data values despite the occurrence of occasional access requests which do not conform to the pattern. This, for example, would enable access requests of a different type to be interleaved with access requests that are following a particular sequence of addresses, without those interleaved access requests causing the prefetch operation to terminate.

The cache circuitry can be arranged to operate as a write through cache or as a write back cache. In one embodiment, the cache circuitry operates as a write back cache, and the linefill operation comprises performing an eviction to evict to said memory current content of a selected cache line, and storing from the memory into the selected cache line new content including the data value the subject of the access request. In such embodiments, the eviction process would also occur each time a cache line is allocated during the first prefetch linefill operation or the second prefetch linefill operation.

Viewed from a second aspect, the present invention provides a data processing apparatus comprising: a processing unit operable to perform data processing operations requiring access to data values stored in memory; cache circuitry operable to store a subset of said data values for access by the processing unit, the cache circuitry comprising: a cache storage comprising a plurality of cache lines for storing said subset of data values; control circuitry, responsive to an access request issued by said processing unit identifying a memory address of a data value to be accessed, to cause a lookup operation to be performed to determine whether the data value for that memory address is stored within the cache storage, and if not to initiate a linefill operation to retrieve the data value from said memory; and prefetch circuitry, responsive to a determination that the memory address specified by a current access request is the same as a predicted memory address, to perform either a first prefetch linefill operation or a second prefetch linefill operation to retrieve from said memory at least one further data value in anticipation of that at least one further data value being the subject of a subsequent access request; the first prefetch linefill operation comprising issuing a sequence of selected memory addresses to said memory, and allocating into a corresponding sequence of cache lines of the cache storage the further data values returned from said memory in response to the sequence of selected memory addresses; the second prefetch linefill operation comprising issuing a selected memory address to said memory, and storing in a linefill buffer the at least one further data value returned from said memory in response to that selected memory address, the at least one further data value only being allocated into a cache line of the cache storage when the subsequent access request specifies said selected memory address; and the prefetch circuitry being responsive to an attribute of said current access request to select either said first prefetch linefill operation or said second prefetch linefill operation.

The processing unit can take a variety of forms, and hence for example may be a processor core, a digital signal processor (DSP), a hardware accelerator, etc. Indeed, in some embodiments, the processing unit itself may include a level of caching, and the cache logic of the present invention may reside at a lower cache level so that in effect the source of the access request is a cache at a higher level.

In one embodiment, the memory comprises one or more hierarchical levels of memory, and the linefill process is performed by the cache circuitry communicating with the hierarchical level of memory adjacent to the cache circuitry.

Viewed from a third aspect, the present invention provides cache circuitry for use in a data processing apparatus, the cache circuitry comprising: a cache storage means comprising a plurality of cache lines for storing data values; control means, responsive to an access request issued by a device of the data processing apparatus identifying a memory address of a data value to be accessed for causing a lookup operation to be performed to determine whether the data value for that memory address is stored within the cache storage means, and if not for initiating a linefill operation to retrieve the data value from memory means; and prefetch means, responsive to a determination that the memory address specified by a current access request is the same as a predicted memory address, for performing either a first prefetch linefill operation or a second prefetch linefill operation to retrieve from said memory means at least one further data value in anticipation of that at least one further data value being the subject of a subsequent access request; the first prefetch linefill operation comprising issuing a sequence of selected memory addresses to said memory means, and allocating into a corresponding sequence of cache lines of the cache storage means the further data values returned from said memory means in response to the sequence of selected memory addresses; the second prefetch linefill operation comprising issuing a selected memory address to said memory means, and storing in a linefill buffer means the at least one further data value returned from said memory means in response to that selected memory address, the at least one further data value only being allocated into a cache line of the cache storage means when the subsequent access request specifies said selected memory address; and the prefetch means being responsive to an attribute of said current access request for selecting either said first prefetch linefill operation or said second prefetch linefill operation.

Viewed from a fourth aspect, the present invention provide a method of prefetching data values for storing in a cache storage comprising a plurality of cache lines for storing said data values, the method comprising the steps of: responsive to an access request issued by a device identifying a memory address of a data value to be accessed, performing a lookup operation to determine whether the data value for that memory address is stored within the cache storage, and if not initiating a linefill operation to retrieve the data value from memory and responsive to a determination that the memory address specified by a current access request is the same as a predicted memory address, performing either a first prefetch linefill operation or a second prefetch linefill operation to retrieve from said memory at least one further data value in anticipation of that at least one further data value being the subject of a subsequent access request, selection of either said first prefetch linefill operation or said second prefetch linefill operation being dependent on an attribute of said current access request; the first prefetch linefill operation comprising issuing a sequence of selected memory addresses to said memory, and allocating into a corresponding sequence of cache lines of the cache storage the further data values returned from said memory in response to the sequence of selected memory addresses; the second prefetch linefill operation comprising issuing a selected memory address to said memory, and storing in a linefill buffer the at least one further data value returned from said memory in response to that selected memory address, the at least one further data value only being allocated into a cache line of the cache storage when the subsequent access request specifies said selected memory address.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
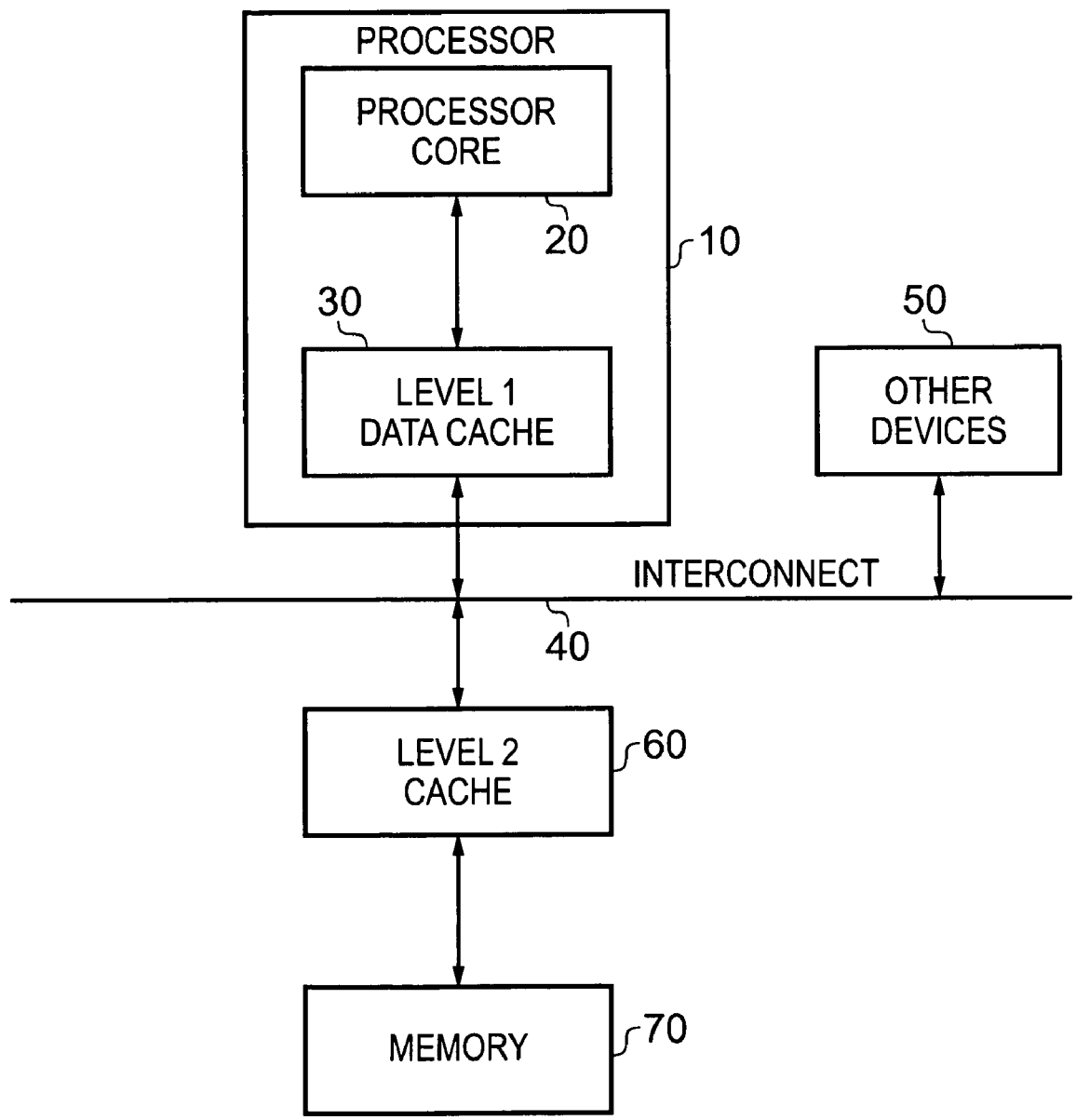
FIG. 1 is a block diagram of a data processing apparatus in accordance with one embodiment of the present invention.

FIG. 1 is a block diagram of a data processing apparatus in accordance with one embodiment of the present invention. As shown in FIG. 1, a processor 10 is provided having a processor core 20 coupled to a level one data cache 30, the data cache 30 being used to store data values for access by the processor core 20 when performing data processing operations. The processor 10 is connected to a bus interconnect 40 via which it can be coupled with other devices 50, and with a memory system, the memory system in this example consisting of a level two cache 60 coupled to memory 70. The other devices 50 can take a variety of forms, and hence can for example be other master devices initiating transactions on the bus interconnect, and/or one or more slave devices used to process transactions issued by master devices on the bus interconnect 40. The processor 10 is an example of a master device, and it will be appreciated that one or more of the other devices 50 may be another processor constructed similarly to processor 10.

When the processor core 20 wishes to access a data value in memory 70, it outputs an access request specifying an address of that data value in memory 70. This access request is received by the level one data cache 30, and assuming the access request pertains to a cacheable region of memory, the level one data cache 30 is arranged to perform a lookup operation in the data cache to determine whether the data value the subject of the access request is present in the cache. If it is, then the data value can be accessed directly in the level one data cache 30 without the need to output a request to memory, thereby significantly saving access time to that data value. Accordingly, if the access request is a road access request, the required data value will be returned from the level one data cache 30 to the processor core 20. If instead the access request is a write access request, then the updated data value output by the processor core 20 can be written into the relevant cache line of the level one data cache 30.

When on performing a lookup operation, it is determined that the data value the subject of the access request is stored within the cache, this is referred to as a cache hit. Conversely, if on performing the lookup operation the data value is not found within the cache, then this is referred to as a cache miss. In the event of a cache miss within the level one data cache 30, the level one data cache will typically output a linefill request to the level two cache 60 via the interconnect 40. This will typically take the form of an access request to the level two cache 60 requesting content from the level two cache 60 sufficient to fill a cache line within the level one data cache, that requested content including the data value initially requested by the processor core 20.

In an analogous manner to that discussed earlier with reference to the level one data cache 30, if the requested content is in the level two cache 60, then it will be returned to the level one data cache 30 (i.e. a hit will occur within the level two cache 60), whereas otherwise a cache miss will be detected, and the level two cache will output a linefill request to memory 70, this linefill request seeking to access data from memory sufficient to fill one of the cache lines in the level two cache, the data requested including the data value initially requested by the processor core 20. Typically, although this is not essential, the cache lines in the level two cache are larger than the cache lines in the level one cache, and accordingly if a hit is detected in the level two cache 60, it will not generally be necessary to output the entire contents of the hit cache line back to the level one data cache 30.

Figure 2:
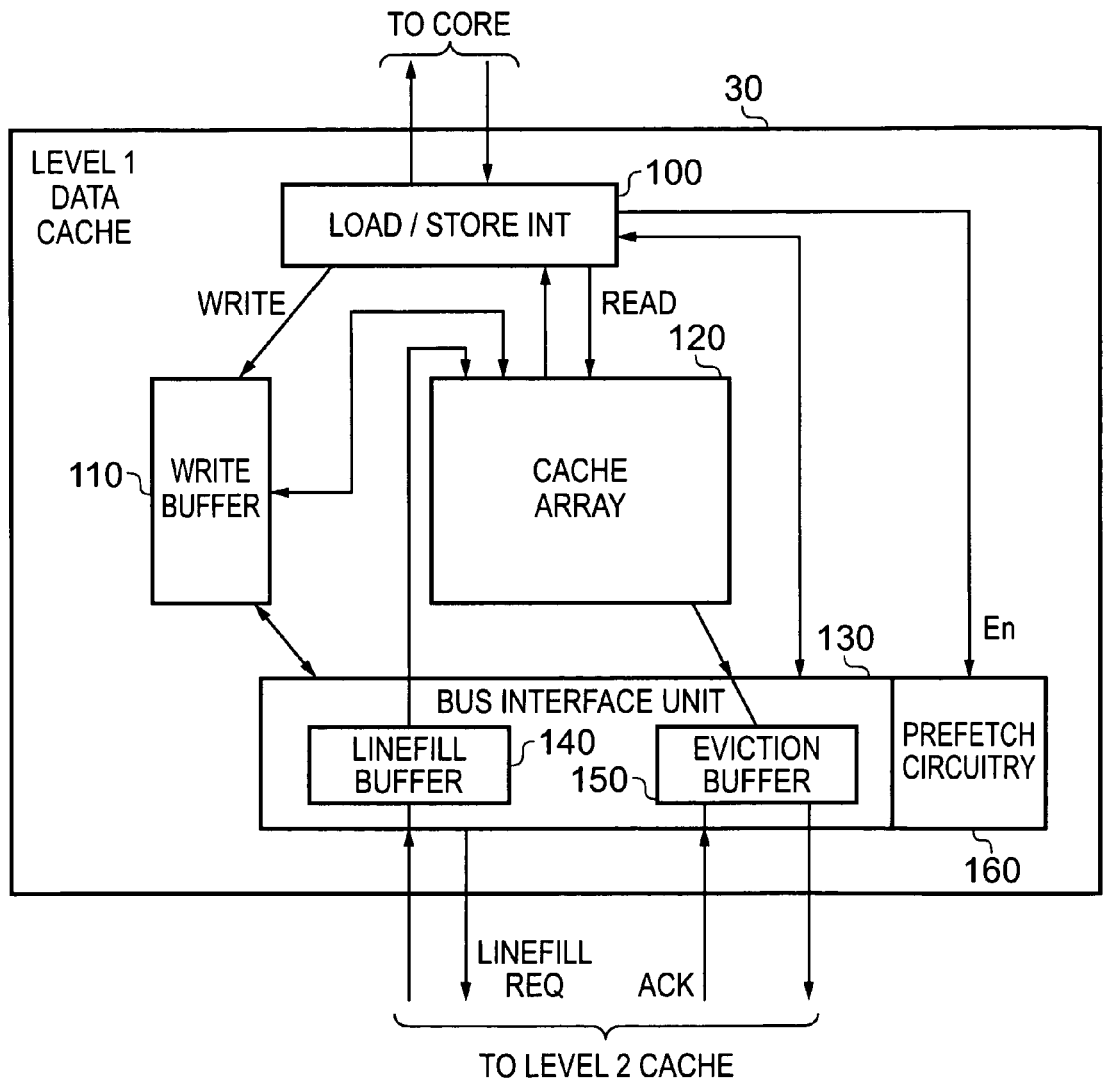
FIG. 2 is a block diagram illustrating circuitry provided within the level one data cache of FIG. 1 in accordance with one embodiment of the present invention.

FIG. 2 is a block diagram illustrating in more detail the logic provided within the level one data cache 30 of FIG. 1 in accordance with one embodiment of the present invention. As shown in FIG. 2, the cache 30 has a load/store interface 100 for interfacing with the processor core, which is arranged to receive read and write access requests from the processor core. For read access requests, a lookup operation is performed within the cache array 120 in order to determine whether the requested data value is in the cache array, and if so that data value is returned via the load/store interface to the processor core. In the event of a cache miss for a read access request, the load/store interface 100 is arranged to instruct the bus interface unit 130 to perform a linefill process. To perform the linefill process, a cache line within the cache array 120 is selected as a victim cache line, and its current contents are forwarded to the eviction buffer 150, from where they are output to the level two cache. Subsequently an acknowledgement signal will be received by the eviction buffer 150 confirming that the data output has been stored in the level two cache, whereafter that entry in the eviction buffer can be removed. In addition to performing the eviction, the bus interface unit 130 will also initiate a linefill request to cause a cache line's worth of data forming new content to till the victim cache line to be retrieved from the level two cache, that retrieved new content being received by the linefill buffer 140 within the bus interface unit 130. Once the new content has been received by the linefill buffer, it is forwarded to the cache array 120 for storing in the victim cache line. The required read data can then be returned from the cache array 120 to the processor core via the load/store interface 100, or alternatively can be output to the load/store interface directly from the linefill buffer 140, either before or whilst the data is being stored within the victim cache line.

Any write accesses received by the load/store interface 100 are forwarded to a write buffer 110 which is responsible for handling those write accesses. When a particular write access request is processed by the write buffer, a lookup request can be performed within the cache array 120 in an analogous way to that performed by the load/store interface 100 for read accesses, and in the event of a hit, the write buffer can output the required data for storing in the relevant cache line of the cache array 120. In the event of a miss, the write buffer 110 will then communicate with the bus interface unit 130 to perform a linefill process, this being analogous to the earlier described linefill process initiated by the load/store interface 100 in respect of a read miss.

In accordance with embodiments of the present invention, the level one data cache 30 also includes prefetch circuitry 160 which can perform prefetch operations with the aim of seeking to retrieve from the level two cache into the cache array 120 certain data values ahead of the time those data values are actually required by the processor core. In particular, the prefetch circuitry can be used when patterns of accesses are detected within the sequence of access requests issued to the level one data cache from the processor core, for example a sequence of accesses where the addresses specified are separated from one another by a predetermined amount (referred to as a stride). Hence, a sequence of accesses may be detected whose addresses are X, X+1, X+2, etc (stride is 1), whose addresses are X, X+2, X+4, etc (stride is 2), etc. The load/store interface 100 may include detection circuitry for detecting such strides, and once a stride has been detected can issue an enable signal to the prefetch circuitry 160 to turn on prefetching. The prefetch circuitry will than start with the next address that is expected to be received in an access request from the processor core, and cause the bus interface unit 130 to perform an appropriate linefill process to retrieve a cache line's worth of data for storing in the cache array 120. In particular, a linefill request will be issued to cause a cache line's worth of data to be retrieved from the level two cache and received in the linefill buffer 140. Prior to that data then being allocated into the cache array 120, it will be necessary to select a victim cache line, and cause the current contents of that victim cache line to be evicted via the eviction buffer 150 in the manner described earlier.

In accordance with embodiments of the present invention, the prefetch circuitry has two different prefetch linefill operations that it can use, and is arranged to select between those two different linefill operations dependent on an attribute of the current access request being handled by the load/store interface 100. In a particular embodiment of the present invention, if the current access request being handled by the load/store interface 100 results from a preload operation being performed by the processor core, then the prefetch circuitry 160 (if enabled at that point) is arranged to perform a first prefetch linefill operation which causes a sequence of selected memory addresses conforming to the detected stride to be issued to the level two cache. The number of selected memory addresses issued can be predetermined, or can be dynamically altered, as will be discussed in more detail later. This will cause a corresponding sequence of blocks of data to be returned from the level two cache, each block forming a cache line's worth or data for storing in the cache array 120. In accordance with the first prefetch linefill operation, as each block of data is received into the linefill buffer 140 it is immediately allocated into the cache array 120 without awaiting receipt of any further access requests from the processor core. Typically, there will only be a relatively small number of linefill buffers 140 provided within the bus interface unit 130, and indeed in some embodiments there may only be a single linefill buffer. Accordingly, it is appropriate to allocate the data into the cache array 120 without delay, so as to make room for subsequent blocks of data retrieved in response to later addresses in the sequence issued by the prefetch circuitry to be able to be stored within the linefill buffer and then forwarded on to the cache array. Although such actions could potentially pollute the cache array 120 with speculative data that is in fact not required, it has been found that for preload operations performed by the processor core, such preload operations do tend to be performed multiple times, and accordingly once a stride has been detected for a preload operation, it is highly likely that further preload operations will be issued conforming to that stride, and accordingly there is a high chance that the data that has been prefetched into the cache array 120 will indeed be the subject of subsequent access requests issued by the processor core.

Typically, such preload operations are performed by the processor core upon execution of a preload instruction inserted in a sequence of instructions executed by the processor core. Typically, such a preload instruction is included within a loop of program instructions that are repeatedly executed by the processor core and often that loop only includes a relatively few number of instructions. Since each instruction added to an instruction sequence reduces code density, such preload instructions are only typically used in loops that are to be executed many times, as this improves the speed benefits to be realised from performing such preload operations. Also such preload instructions are only used to preload data that the software expects to subsequently need, and hence are likely to be the subject of subsequent load operations.

In accordance with one embodiment of the present invention, for access requests received by the load/store interface 100 resulting from any other activities of the processor core (i.e. any activities other than preload activities), the prefetch circuitry 160 is arranged to perform a second prefetch linefill operation. In accordance with this second prefetch linefill operation, a selected memory address determined by adding the stride value to the address of a current access request received by the load/store interface is used to generate a linefill request from the bus interface unit 130, and when the corresponding block of data is returned from the level two cache, it is stored within the linefill buffer 140. However, it is not at that time allocated to the cache array 120, and instead is retained within the linefill buffer 140 until a subsequent access request is received at the load/store interface 100 from the processor core that is seeking to access data at that predicted address. At that point, the data is allocated into the cache array 120 and at the same time is returned to the processor core via the load/store interface 100. This incurs a slight time penalty compared with the approach where the data has already been allocated into the cache array 120, but avoids any cache pollution problems that would occur if the data were allocated into the cache array 120 and were in fact not subsequently requested by the processor core. Accordingly, through embodiments of the present invention, the prefetch circuitry 160 can be arranged to adopt either of two possible linefill operation behaviours, with the choice as to which behaviour is used being dependent on the type of access taking place in respect of the level one data cache 30. More details of the operation of the prefetch circuitry 160 will now be provided with reference to FIG. 3.

At step 200, it is determined whether a request has been received from the processor core. When a request is received at step 200, it is then determined at step 205 whether the current address X specified in that access request is an expected address. Typically, this is determined by comparing the current address with the address that would be obtained by adding a current detected stride value to the address of a previous access request. It is then determined at step 210 whether a match condition has been detected. This may involve simply determining whether the comparison performed at step 205 matched, but in alternative embodiments a number of separate tests may be performed, and the match determination made in dependence on the outcome of those various tests. For example, time windows may be established, such that it may not be necessary for each sequential access request received to specify an address which conforms to the expected address, provided that periodically within that established time window access requests whose addresses do conform to the expected addresses are observed. Indeed one such mechanism that can be used as part of the match detection step performed at step 210 of FIG. 3 will be described later with reference to FIG. 5.

Assuming the match conditions are determined to have been met at step 210, then the process proceeds to step 220 where the prefetch circuitry 160 is enabled to perform prefetching operations, whereas if instead the match conditions are determined not to have been met at step 210, the process proceeds to step 215, where the prefetch process is ended, at which point the load/store interface 100 will de-assert the enable signal to the prefetch circuitry 160. In one embodiment, the steps 200, 205, 210 are performed by the load/store interface 100.

Assuming the match conditions are determined to have been met at step 210, the prefetching is enabled and at step 220 the current address is incremented by the stride value. It is then determined at step 225 whether the current access request from the processor core is a preload (PLD) access request. If so, the process proceeds to step 230 via optional steps A, B that will be described in more detail later with reference to FIGS. 4A and 4B. At this point, the earlier-mentioned first prefetch linefill operation will be performed, causing a sequence of selected memory addresses to be issued. The number of addresses within that sequence will be a predetermined number Z. Hence, by way of example, if Z is 3, and the stride is 1, then the first prefetch linefill operation will cause addresses X, X+1 and X+2 to be issued to the memory system (X being the incremented address produced at step 220). However, it is important that linefill requests are not issued in respect of any data which is already within the cache array 120. Accordingly, at step 230, a lookup operation is performed in respect of the cache array 120 for each of the addresses that are to be issued by the first prefetch linefill operation, and hence Z lookup operations are performed. It is determined at step 230 whether any of those Z lookups have hit in the cache, and if not, the process proceeds to step 235, where Z PLD linefill requests are issued starting at the current address. However, if any of the Z lookups did hit in the cache, then the process proceeds to step 240 where PLD linefill requests are only issued in respect of addresses whose corresponding lookup operation did not produce a hit in the cache.

The process then proceeds from wither steps 235 or 240 to step 245, where for any linefill requests that have been issued at steps 235, 240, the corresponding data returned to the linefill buffer is allocated to the cache when received in the linefill buffer. Thereafter, the process returns to step 200. In practice, the process does not stall at step 245 until all of the requested data has been returned, but instead the information that is needed to allocate the data when received is registered, and then the process immediately returns to stop 200, with the allocation specified at stop 245 taking place as and when the data is returned from the level two cache. Clearly if at step 240 no PLD linefill requests were actually issued (because all of the lookups hit in the cache), then there will be no step to be taken at step 245 and the process can proceed directly from step 240 back to step 200.

If at step 225, it is determined that the current access request from the core is not a PLD access request, then the process proceeds to step 245 where it is determined whether a lookup operation performed in respect of the current address (which as mentioned earlier has been incremented at step 220 by the stride) produces a hit in the cache. If it does, then no prefetch operation is performed and the process returns to step 200. However, assuming a hit is not detected, then the process proceeds to step 250 where a linefill request is issued based on the current address. Subsequently, this will cause the data requested to be received by the linefill buffer 140 (at step 255), whereafter at step 260 the process waits for a request to be received from the core. In practice, the request from the core may in fact have been received before the data is received in the linefill buffer, and accordingly no wait is required, but in other instances the data may be received in the linefill buffer before the next request is received from the core, and accordingly some wait is incurred. Once a request has been received from the core, then it is determined at step 265 whether that request is seeking to access data at the current address. If it is, then at step 275 the data stored in the linefill buffer is allocated into the cache and a hit is generated with the required data being returned via the load/store interface 100 to the processor core to service that access request. As an alternative to allocating the data and then generating the hit, the data may be read directly from the linefill buffer and then allocated into the cache.

Figure 3:
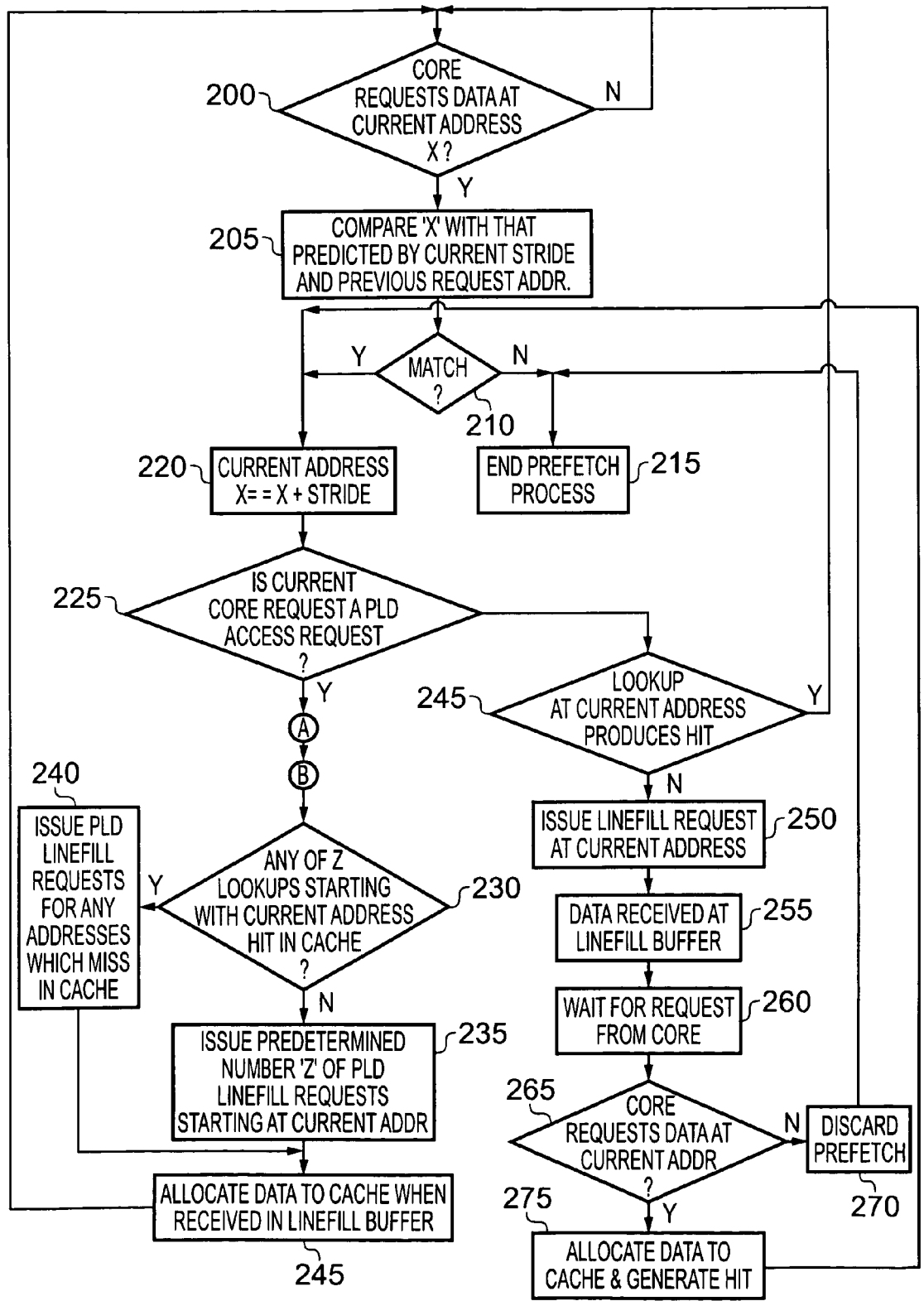
FIG. 3 is a flow diagram illustrating the prefetch operations performed within the level one data cache of FIG. 2 in accordance with one embodiment of the present invention.

In the embodiment illustrated in FIG. 3, if the core request analysed at step 265 does not specify data at the current address, then the process proceeds to step 270, where the prefetched data in the linefill buffer is discarded, whereafter the process returns to step 215 where the prefetch process is ended. In an alternative embodiment, such a detection at step 265 may be arranged to not immediately result in the discard of the prefetched data, and instead the process may wait some predetermined time to see if another access request is subsequently issued which does request data at the current address. This would in effect involve looping back from step 265 to step 260 to wait for another request and if within a certain time period a request is received which specifies data at the current address, the process can then proceed to step 275 as discussed earlier. However, if within a predetermined time no request is received specifying data at the required address, then the process could proceed to step 270 to discard the prefetched data in the linefill buffer and to end the prefetch process.

When the prefetch process ends at step 215, the enable signal to the prefetch circuitry 160 is disabled. At this point, the load/store interface 100 will continue to analyse subsequent access requests received in order to seek to detect a subsequent pattern of accesses emerging, for example a sequence of accesses with a common stride between addresses, and when such a pattern has been detected, the prefetch circuitry will be re-enabled, and the process of FIG. 3 will restart.

In order to enable a determination to be made at step 225 as to whether the current access request from the core relates to a PLD access, information about the type of access needs to be routed from the core to the load/store interface 100 of the level one data cache. This can either be provided as an additional signal, or alternatively such information may already be available to the level one data cache for other reasons. In particular, in one embodiment, the level one data cache 30 is already provided with information identifying PLD access requests and that information is already used by the load/store interface to manage the linefill process that the load/store interface 100 will initiate in the event of a cache miss (i.e. to cause the data to be loaded into the cache but not at that time returned to the core).

Figure 4A:
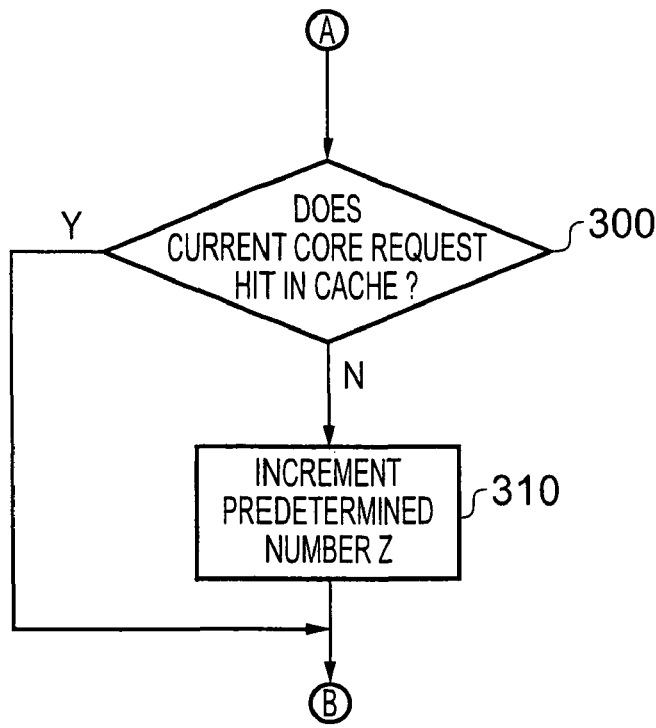
FIGS. 4A and 4B are flow diagrams illustrating optional sequences which may be inserted within the operations described in FIG. 3 in accordance with one embodiment of the present invention.

FIG. 4A is a flow diagram illustrating a sequence of steps that can be located between points A and B in the flow diagram of FIG. 3 in accordance with one embodiment of the present invention. In particular, in accordance with the embodiment illustrated in FIG. 4A, the number of memory addresses which are issued at step 235 when performing the first prefetch linefill operation is not fixed, and instead can be dynamically changed on each iteration. Accordingly, at step 300, it is determined whether the current access request from the core hits in the cache array 120. If it does, then the process merely proceeds directly to point B, and accordingly proceeds to step 230 shown in FIG. 3. However, if the current access request does not hit in the cache, then the predetermined number Z is incremented at step 310 so that on this subsequent iteration, when executing stops 230, 235, 240, 245, an increased number of linefill requests are issued relative to a previous iteration of those stops. The aim of such a process is that over time the predetermined number Z will be increased until a point is reached where subsequent PLD access requests issued by the core begin to hit in the cache array 120, at which point the latency of the memory system has been hidden from the processor core.

As an example, the value of Z may initially be chosen to be 1. When a stride is detected for a sequence of PLD accesses initiated by the processor core, prefetching is turned on, and the first prefetch linefill operation is selected at step 225 due to it being detected that the access requests are PLD access requests. On a first iteration through the prefetch process, it is quite likely that the next PLD access request will be issued by the core before the prefetched data requested by the prefetch circuitry has been obtained from the level two cache and allocated to the cache. Accordingly, when this next PLD request is received from the core, steps 300, 310 will cause the number Z to be incremented. The incrementing may involve merely increasing the previous value of Z by 1, or alternatively may be arranged to increment in steps larger than 1.

At some point during reiteration of the first prefetch linefill operation, a point will be reached where a next PLD access request issued by the core hits in the cache array 120, due to the increased number of linefill requests that are being issued on each iteration of the first prefetch linefill operation. At this point, in accordance with the process of FIG. 4A, the current value of Z becomes fixed and is not further incremented. It is then likely that each subsequent PLD access request will continue to hit in the cache array, and hence from this point onwards the latency of the memory will have been covered. If at some subsequent point the rate of the PLD access requests issued by the core increases, or the time taken to perform linefill requests with respect to the level two cache increases, it is possible that subsequent PLD access requests issued by the core will again start to miss in the cache. However, at this point, steps 300, 310 will again cause the value of Z to begin to be incremented until a point is reached where subsequent PLD access requests begin to hit again in the cache array 120.

As a further possible adaptation of the process of FIG. 4A, it would be possible to arrange for the "yes" path from step 300 to pass via a stop whereby the predetermined number Z was decremented, if this were considered appropriate. Since each linefill request issued to the level two cache consumes resources within the level two cache in order to obtain the required data and return it to the linefill buffer 140, such an approach would enable the value Z to be decreased in situations where inure linefill requests were being issued than was necessary to mask the latency of the level two cache.

Figure 4B:
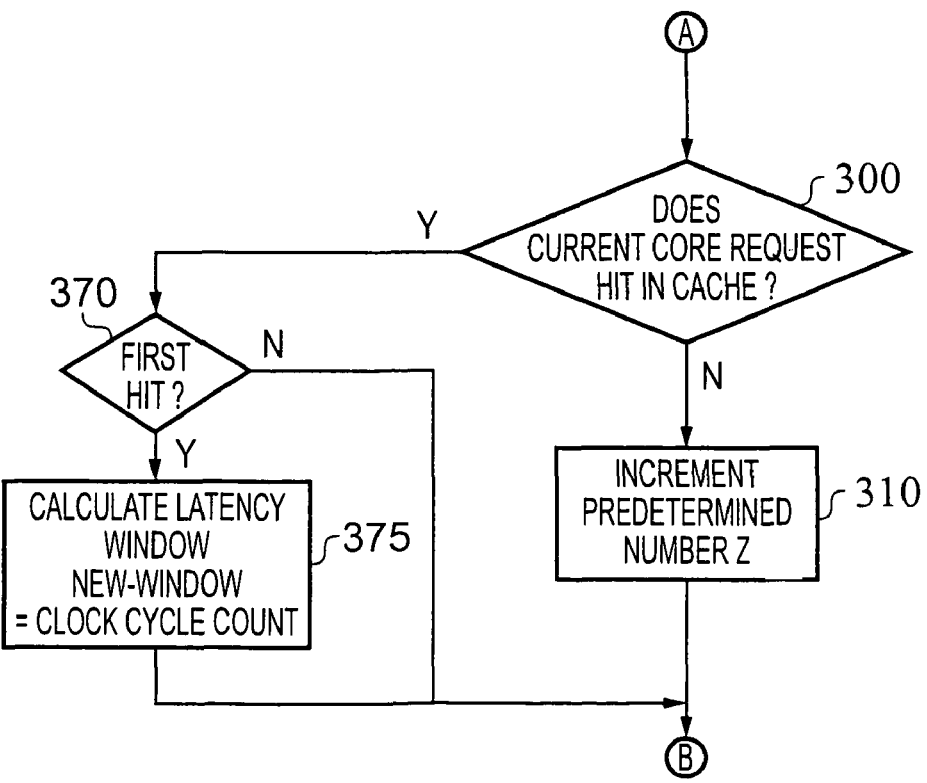

FIG. 4B illustrates an alternative sequence of steps that may be inserted within points A and B in FIG. 3 in accordance with an alternative embodiment where a latency window is established to be used when detecting whether the match condition has been met at step 210. In particular, as can be seen from FIG. 4B, steps 300, 310 are the equivalent of steps 300, 310 discussed earlier with reference to FIG. 4A. However, in accordance with the method of FIG. 4B, if the current access request from the core hits in the cache, it is determined at step 370 whether this is the first time that an access request from the core has hit in the cache since the prefetch circuitry was enabled to begin prefetching. If it is not, the process merely proceeds to point B. However, if it is the first hit, then the process proceeds to step 375 where a latency window is calculated. In particular, a parameter new_window is set equal to the clock cycle count that has elapsed since the prefetch circuitry was enabled. Then the process continues to point B. The manner in which this new_window parameter is then used when determining whether the match conditions have been met at step 210 will now be described in more detail with reference to FIG. 5.

Figure 5:
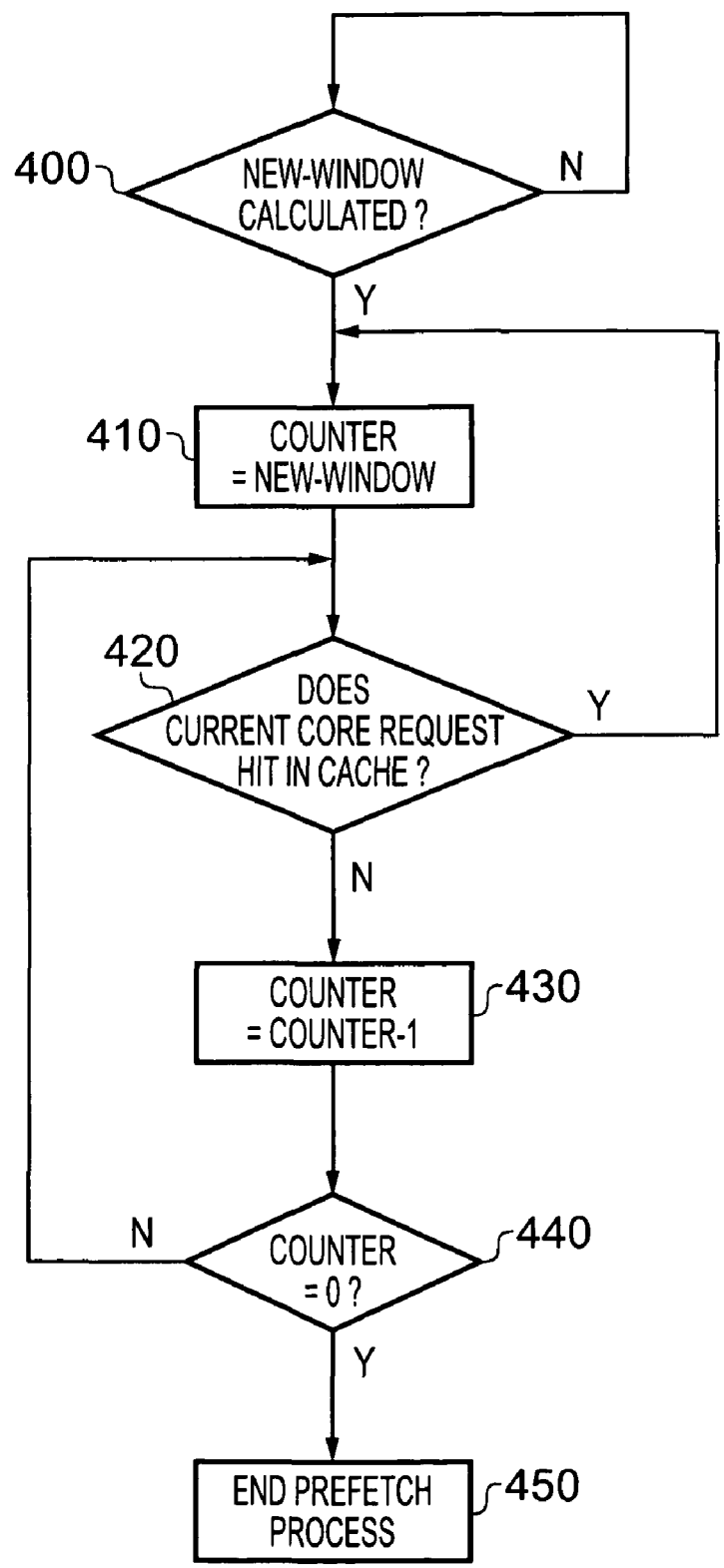
FIG. 5 is a flow diagram illustrating one technique that may be used to determine when to end the prefetch process of embodiments of the present invention when employing the optional steps shown in FIG. 4B.

The process in FIG. 5 is just one of potentially a number of different processes that may be run in parallel in order to determine whether the match condition has been met and accordingly prefetching should continue, or whether instead the match condition has not been met and prefetching should end. At step 400, it is determined whether the parameter new_window has been calculated, i.e. whether step 375 has been performed to define the new_window value. Once it has, then during each clock cycle the remainder of the process illustrated in FIG. 5 is performed. In particular, at step 410, a counter value is set equal to the new_window parameter, whereafter at stop 420, it is determined whether a current access request from the core hits in the cache. If it does, then the counter is reset to the new_window value at step 410. However, if it does not, than the counter is decremented at step 430, and it is then determined at step 440 whether the counter has reached zero. If not, the process returns to step 420. However, if at step 440 it is determined that the counter has decreased to zero, then the process proceeds to step 450 where the prefetch process is ended.

Accordingly, from FIG. 5, it can be seen that a timing window can be set to a value corresponding to the number of clock cycles it has taken from the time the prefetch circuitry was enabled until the first time a PLD access request issued by the core hit in the cache array. As long as a subsequent PLD access request is observed hitting in the cache within such a time frame, the counter will continue to be reset. However, if a continuous period of time elapses equivalent to this timing window without a single PLD access request being received which hits in the cache, then the prefetch process will terminate. Hence, the approach of FIG. 5 provides one mechanism that can be used, typically in combination with one or more other mechanisms, at step 210 to determine whether prefetching should continue, or whether instead prefetching should cease.

From the above description of embodiments of the present invention, it will be appreciated that such embodiments provide a prefetching mechanism whose behaviour can be altered dependent on the type of accesses taking place, with the aim of choosing the most efficient prefetch behaviour for particular types of access. In particular, a first type of prefetch access operation is used when PLD access requests conforming to an identified pattern are issued to the cache 30, this mechanism typically performing multiple linefill requests at a time and allocating the data straight into the cache when received from the level two cache. For PLD accesses, it has been found that such an approach gives rise to good performance, and the risks of pollution of the cache are minimised due to the fact that typically a large sequence of PLD access requests are issued by the core, and accordingly there is a high chance that the data prefetched will in fact be the subject of a subsequent PLD access request. For any other types of access where a pattern is detected, the prefetch circuitry performs a second prefetch linefill operation where a single cache line's worth of data is retrieved and placed in the linefill buffer, but that data is only allocated to the cache once a subsequent access inquest is received from the core seeking to access that data. This avoids the problem of polluting the cache array 120 with data which is not in fact required, which is particularly beneficial in caches that are relatively small, as indeed will typically be the case for a level one cache such as the level one data cache 30 shown in FIG. 1.

Furthermore, in certain embodiments of the present invention, the number of prefetch accesses initiated each time the first prefetch linefill operation is undertaken can be dynamically adjusted to the unknown memory latency, until a point is reached where subsequent PLD access requests begin to hit in the cache, at which point the memory latency has been hidden from the processor core. By enabling the number of accesses to be dynamically adjusted, it can be ensured that the bus is not overloaded when unnecessary.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. Cache circuitry for use in a data processing apparatus, the cache circuitry comprising:
   a cache storage comprising a plurality of cache lines for storing data values;
   control circuitry, responsive to an access request issued by a device of the data processing apparatus identifying a memory address of a data value to be accessed, configured to cause a lookup operation to be performed to determine whether the data value for that memory address is stored within the cache storage, and if not to initiate a linefill operation to retrieve the data value from memory; and
   prefetch circuitry configured to determine that the memory address specified by a current access request is the same as a predicted memory address, and, upon said determination, to perform either a first prefetch linefill operation or a second prefetch linefill operation to retrieve from said memory at least one further data value in anticipation of that at least one further data value being the subject of a subsequent access request;
   the first prefetch linefill operation comprising issuing a sequence of selected memory addresses to said memory, and allocating into a corresponding sequence of cache lines of the cache storage the further data values returned from said memory in response to the sequence of selected memory addresses;
   the second prefetch linefill operation comprising issuing a selected memory address to said memory, and storing in a linefill buffer the at least one further data value returned from said memory in response to that selected memory address, the at least one further data value only being allocated into a cache line of the cache storage when the subsequent access request specifies said selected memory address; and
   the prefetch circuitry, responsive to an attribute of said current access request, configured to select either said first prefetch linefill operation or said second prefetch linefill operation, wherein the attribute of said current access request comprises an indication as to whether that current access request is being issued by said device to perform a preload operation, if the current access request is being issued to perform said preload operation the prefetch circuitry performs said first prefetch linefill operation, whereas otherwise the prefetch circuitry performs said second prefetch linefill operation.

2. Cache circuitry as claimed in claim 1, wherein said preload operation is performed by said device in response to execution of a preload instruction.

3. Cache circuitry as claimed in claim 2, wherein said preload instruction is provided within a loop of program instructions repeatedly executed by the device.

4. Cache circuitry as claimed in claim 1, wherein said prefetch circuitry is responsive to an indication as to whether the lookup operation performed by the control circuitry detects a hit in the cache storage and configured to determine a number of selected memory addresses to form said sequence issued when performing said first prefetch linefill operation.

5. Cache circuitry as claimed in claim 4, wherein a current value of said number is incremented by a predetermined value if said indication indicates that the lookup operation has not detected a hit in the cache storage.

6. Cache circuitry as claimed in claim 4, wherein a current value of said number is not altered if said indication indicates that the lookup operation has detected a hit in the cache storage.

7. Cache circuitry as claimed in claim 1, wherein the operation of said prefetch circuitry is repeated each time a determination is made that the memory address specified by a subsequent current access request is the same as a subsequent predicted memory address.

8. Cache logic as claimed in claim 1, wherein the operation of said prefetch circuitry is terminated upon determination that the memory address specified by said subsequent current access request is different to a subsequent predicted memory address.

9. Cache circuitry as claimed in claim 1 wherein the linefill operation comprises performing an eviction to evict to said memory current content of a selected cache line, and storing from the memory into the selected cache line new content including the data value the subject of the access request.

10. A data processing apparatus comprising:
    a processing unit configured to perform data processing operations requiring access to data values stored in memory;
    cache circuitry configured to store a subset of said data values for access by the processing unit, the cache circuitry comprising:
    a cache storage comprising a plurality of cache lines for storing said subset of data values;
    control circuitry, responsive to an access request issued by said processing unit identifying a memory address of a data value to be accessed, configured to cause a lookup operation to be performed to determine whether the data value for that memory address is stored within the cache storage, and if not to initiate a linefill operation to retrieve the data value from said memory; and
    prefetch circuitry configured to determine that the memory address specified by a current access request is the same as a predicted memory address, and upon said determination, to perform either a first prefetch linefill operation or a second prefetch linefill operation to retrieve from said memory at least one further data value in anticipation of that at least one further data value being the subject of a subsequent access request;
    the first prefetch linefill operation comprising issuing a sequence of selected memory addresses to said memory, and allocating into a corresponding sequence of cache lines of the cache storage the further data values returned from said memory in response to the sequence of selected memory addresses;
    the second prefetch linefill operation comprising issuing a selected memory address to said memory, and storing in a linefill buffer the at least one further data value returned from said memory in response to that selected memory address, the at least one further data value only being allocated into a cache line of the cache storage when the subsequent access request specifies said selected memory address; and
    the prefetch circuitry, responsive to an attribute of said current access request, configured to select either said first prefetch linefill operation or said second prefetch linefill operation, wherein the attribute of said current access request comprises an indication as to whether that current access request is being issued by said processing unit to perform a preload operation, if the current access request is being issued to perform said preload operation the prefetch circuitry performs said first prefetch linefill operation, whereas otherwise the prefetch circuitry performs said second prefetch linefill operation.

11. A data processing apparatus as claimed in claim 10, wherein the processing unit is a processor core and the cache circuitry is a level 1 cache associated with the processor core.

12. A data processing apparatus as claimed in claim 10, wherein the memory comprises one or more hierarchical levels of memory, and each linefill operation is performed by the cache circuitry communicating with the hierarchical level of memory adjacent to the cache circuitry.

13. Cache circuitry for use in a data processing apparatus, the cache circuitry comprising:

a cache storage means comprising a plurality of cache lines for storing data values;

control means, responsive to an access request issued by a device of the data processing apparatus identifying a memory address of a data value to be accessed, for causing a lookup operation to be performed to determine whether the data value for that memory address is stored within the cache storage means, and if not for initiating a linefill operation to retrieve the data value from memory means; and prefetch means for determining that the memory address specified by a current access request is the same as a predicted memory address, and, upon said determination, for performing either a first prefetch linefill operation or a second prefetch linefill operation to retrieve from said memory means at least one further data value in anticipation of that at least one further data value being the subject of a subsequent access request;

the first prefetch linefill operation comprising issuing a sequence of selected memory addresses to said memory means, and allocating into a corresponding sequence of cache lines of the cache storage means the further data values returned from said memory means in response to the sequence of selected memory addresses;

the second prefetch linefill operation comprising issuing a selected memory address to said memory means, and storing in a linefill buffer means the at least one further data value returned from said memory means in response to that selected memory address, the at least one further data value only being allocated into a cache line of the cache storage means when the subsequent access request specifies said selected memory address; and the prefetch means being responsive to an attribute of said current access request for selecting either said first prefetch linefill operation or said second prefetch linefill operation, wherein the attribute of said current access request comprises an indication as to whether that current access request is being issued by said device to perform a preload operation, if the current access request is being issued to perform said preload operation the prefetch means performs said first prefetch linefill operation, whereas otherwise the prefetch means performs said second prefetch linefill operation.

14. A method of prefetching data values for storing in a cache storage comprising a plurality of cache lines for storing said data values, the method comprising the steps of:

responsive to an access request issued by a device identifying a memory address of a data value to be accessed, performing a lookup operation to determine whether the data value for that memory address is stored within the cache storage, and if not initiating a linefill operation to retrieve the data value from memory; and responsive to a determination by prefetch circuitry that the memory address specified by a current access request is the same as a predicted memory address, said prefetch circuitry performing either a first prefetch linefill operation or a second prefetch linefill operation to retrieve from said memory at least one further data value in anticipation of that at least one further data value being the subject of a subsequent access request, selection of either said first prefetch linefill operation or said second prefetch linefill operation being dependent on an attribute of said current access request;

the first prefetch linefill operation comprising issuing a sequence of selected memory addresses to said memory, and allocating into a corresponding sequence of cache lines of the cache storage the further data values returned from said memory in response to the sequence of selected memory addresses;

the second prefetch linefill operation comprising issuing a selected memory address to said memory, and storing in a linefill buffer the at least one further data value returned from said memory in response to that selected memory address, the at least one further data value only being allocated into a cache line of the cache storage when the subsequent access request specifies said selected memory address, wherein the attribute of said current access request comprises an indication as to whether that current access request is being issued by said device to perform a preload operation, if the current access request is being issued to perform said preload operation the prefetch circuitry performs said first prefetch linefill operation, whereas otherwise the prefetch circuitry performs said second prefetch linefill operation.

* * * * *